United States Patent [19]
Else

[11] Patent Number: 5,522,618
[45] Date of Patent: Jun. 4, 1996

[54] SAFETY BELT ARRANGEMENT

[75] Inventor: Robert F. Else, Fareham, Great Britain

[73] Assignee: General Engineering (Netherlands) B.V., Netherlands

[21] Appl. No.: 348,883

[22] Filed: Nov. 28, 1994

Related U.S. Application Data

[63] Continuation of Ser. No. 992,939, Dec. 22, 1992, abandoned.

[30] Foreign Application Priority Data

Dec. 23, 1991 [GB] United Kingdom ............... 9127303

[51] Int. Cl.$^6$ .................................................. B60R 22/00
[52] U.S. Cl. ........................................................ 280/801.2
[58] Field of Search ........................... 280/801.1, 801.2

[56] References Cited

U.S. PATENT DOCUMENTS 4,569,537 2/1986 Else ........................................ 280/801 A
4,786,081 11/1988 Schmidt ................................. 280/801 A
5,149,136 9/1992 Maekawa et al. ..................... 280/801 A

FOREIGN PATENT DOCUMENTS 2412253 9/1975 Germany ............................. 280/801 A

*Primary Examiner*—Eric D. Culbreth
*Attorney, Agent, or Firm*—Spencer & Frank

[57] ABSTRACT

A height adjuster for a safety belt arrangement includes a first element adapted to be fixed in position and has at least one aperture or recess therein and a rail for connection to the first element. A carriage is mounted and movably retained on the rail for sliding movement along the rail. A guide loop for guiding a safety belt is carried by the carriage. A latch, carried by the carriage, engages the at least one aperture or recess in the first element to selectively lock the carriage in position.

15 Claims, 7 Drawing Sheets

SAFETY BELT ARRANGEMENT

This application is a continuation of application Ser. No. 07/992,939, filed Dec. 22, 1992, abandoned.

BACKGROUND OF THE INVENTION

1. Field of the Invention

The present invention relates to a safety belt arrangement and more particularly relates to a shoulder loop height adjuster for use with a safety belt in a motor vehicle such as a motor car.

2. Background Information

It has been proposed previously to provide a shoulder loop height adjuster for a safety belt in a motor vehicle.

Typically an assembly is fabricated consisting of a rail and a carriage mounted on the rail the carriage carrying a loop through which part of the safety belt may pass. At an advanced stage in the manufacture of the car, the rail is secured to the B-pillar in the car, for example by screws or bolts. This procedure is expensive.

In a typical prior an arrangement, the carriage moves along a rail which is formed by two inwardly directed metal flanges. There may thus be some noise associated with the movement of the carriage.

SUMMARY OF THE INVENTION

The present invention seeks to provide an improved height adjuster.

According to the invention there is provided a height adjuster for a safety belt arrangement, the height adjuster comprising a first element adapted to be fixed in position a rail adapted to be connected to the said first element, a carriage mounted for sliding movement along the rail, and a guide loop for a safety belt carried by the carriage, means being provided to selectively lock the carriage in position.

Preferably the carriage is mounted on the rail before the rail is connected to the first element.

Conveniently the first element has two inwardly directed lips forming the sides of a channel, and the rail is adapted to be connected to the lips. Preferably the rail is adapted m be slid into position on said lips.

Conveniently the carriage and the raft is made of a plastic material.

Advantageously the carriage carries a latch, the latch carrying one or more teeth engageable with apertures or recesses provided in the first element and/or the rail to lock the carriage in position.

Preferably the teeth engage apertures or recesses formed in the first element.

Conveniently the teeth engage apertures or recesses formed in the rail.

Preferably the latch is provided with two sets of teeth, one set of teeth engaging the said apertures or recesses in ordinary use of the arrangement, the second set of teeth being adapted to engage further apertures or recesses if the latch is deformed when subjected to a significant load.

Conveniently the latch comprises a cranked plate, one set of teeth being on one side of the crank and another set of teeth on the other side of the crank.

Preferably the latch is pivotally connected to the carriage.

Conveniently the support plate comprises a plate formed of metal, having two side portions interconnected by bridges extending above or below the plane of the side portion, the plate thus defining a substantially open axial channel extending over the entire length of the support plate.

Preferably the support plate is welded or otherwise secured to the B-post of the motor vehicle, or another part of the vehicle.

BRIEF DESCRIPTION OF THE DRAWINGS

In order that the invention may be more readily understood, and so that further features thereof may be appreciated, the invention will now be described, by way of example, with reference to the accompanying drawings, in which.

DETAILED DESCRIPTION OF THE PREFERRED EMBODIMENT(S)

The underlying concept of the invention is that a metal support plate is formed integrally with a post or welded to the post (which may be the B-post) during a modular early stage in the manufacture of the motor vehicle. Subsequently an assembly comprising a rail, formed of plastic material, carrying a carriage, also formed of plastic material, to which is secured a latch and a loop, may be mounted on the support plate in a straightforward manner.

The combination of the rail, the carriage, the latch and the loop may be pre-assembled and pre-tested. Also, because the carriage is of plastic material and the rail is of plastics material, the carriage will run smoothly and substantially silently along the rail.

Figure 1:
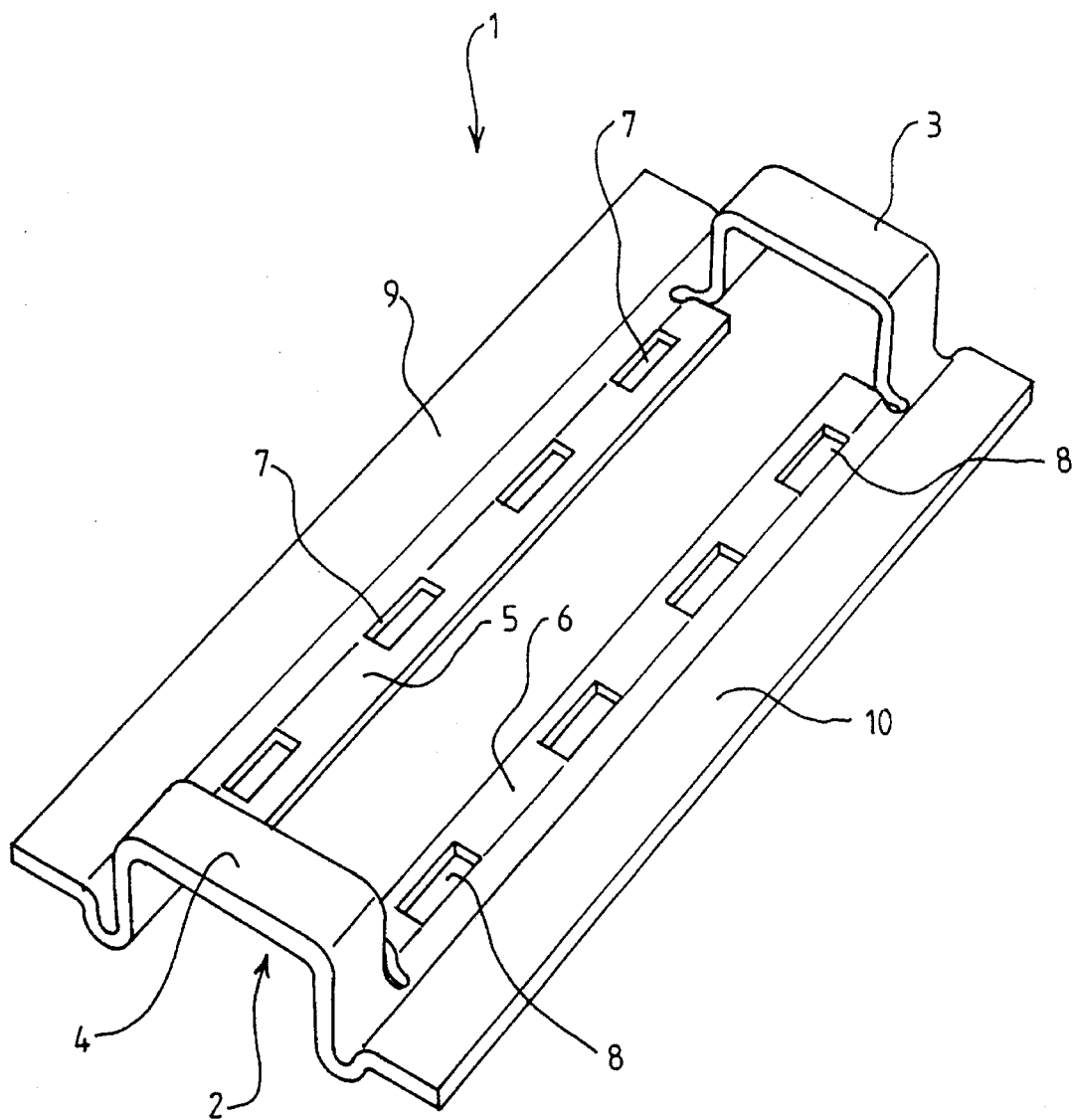
FIG. 1 is a perspective view of a support plate to be attached to or incorporated in the B-pillar of a motor vehicle.

Referring now to FIG. 1, a support plate 1 is illustrated in perspective. The support plate comprising a substantially rectangular plate defining an axially extending central slot or channel 2. Parts of the plate, at each end of the plate form bridges 3, 4 extending up and over the channel 2 so that in the plane of the major part of the plate the channel 2 is unobstructed.

The channel 2 is defined by two inwardly directed lips 5, 6 which form the edges of the channel 2. The lips 5, 6 are each provided with a plurality of evenly spaced rectangular apertures 7, 8 the purpose of which will be described hereinafter in greater detail.

The outer edges of the plate 1, beyond the bridges 3 and 4 define upwardly facing surfaces 9, 10 (in the orientation shown in FIG. 1) which can be welded or otherwise secured to the B-post to mount the support plate in position. When in position, the support plate is substantially vertical. However, in a modified embodiment of the invention the portions of the plate defining the surfaces 9, 10 may be extended to form a significant part of the B-post.

Figure 2:
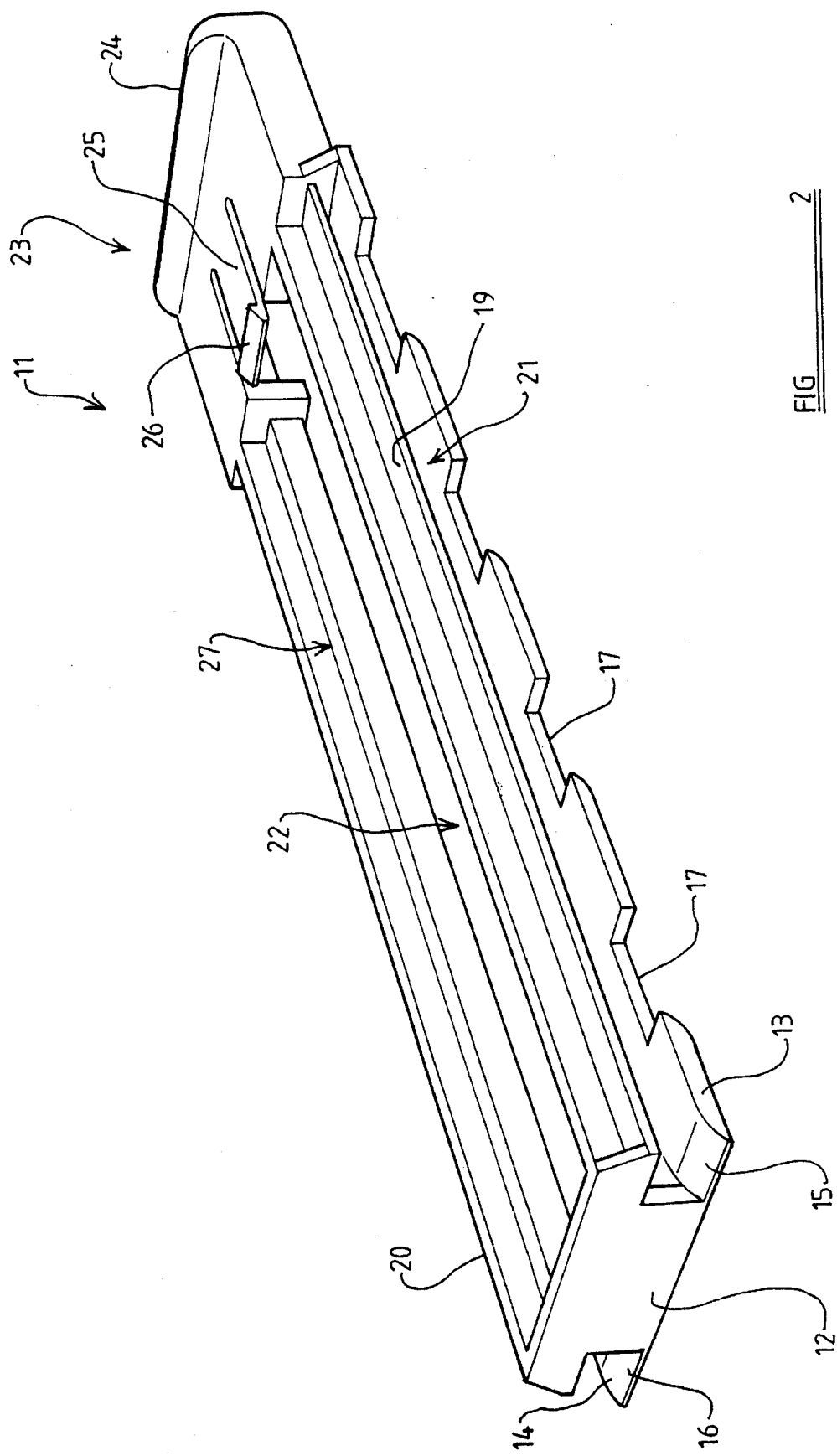
FIG. 2 is a perspective view of a rail elements adapted to be connected to the support plate.

Referring now to FIG. 2, an elongate raft element 11 is illustrated adapted to be mounted on the support plate 1 of FIG. 1. The rail element 11 is formed of a plastic material and is of elongate form and has an end 12, visible towards the left-hand side of FIG. 2 which is of substantially "I" configuration. It can be seen that the raft element defines, on each side, a lower outwardly extending flange 13, 14. Adjacent the end 12 each flange is provided with a tapering or chamfered surface 15, 16 for a reason which will be explained hereinafter.

The flanges 13, 14 are provided with recesses 17, formed in the side thereof, having a length and a spacing equal to the length and spacing of the apertures 8 present on the plate 1. At a position above the flanges 13, 14, two further flanges 19, 20 project outwardly and a channel 21 is defined between the flange 19 and the flange 13. A similar channel is defined between the flange 20 and the flange 14.

It will thus be appreciated that the end face 12 has a substantially "I" configuration, with opposed channels being formed on either side of the rail element.

When viewed from above, the rail element defines a substantially rectangular central aperture 22 which extends through the rail.

At the end of the rail remote from the end 12 is a head piece 23. The head piece 23 terminates, at its free end, with an upstanding flange 24, and the head piece carries a resilient finger 25 directed axially of the rail which carries a detent 26.

The aperture 22 is bounded, on either longitudinal side, by a stepped portion 27 defining a horizontal surface adjacent the edge of the aperture 22.

The rail 11 is dimensioned so that the rail may be slid underneath the bridge 3 formed at one end of the support plate 1, and the inwardly directed lips 5, 6 may be received within the channels 21 defined between the flanges 13, 14 and 19, 20. The chamfered portions 15, 16 serve to ease the entry of the lips 5, 6 into the 21. The rail element 11 may then be pushed axially of the support plate, until the head 23 becomes substantially aligned with the bridge 3.

The bridge 3 will engage a chamfered or sloping face present on the detent 26 thus forcing the resilient finger to bend, moving the detent 26 downwardly. As the raft continues to move, the flange 24 will abut the bridge 3 and, simultaneously, the detent 26 will move beyond the bridge 3, thus permitting the resilient finger 25 to return to an initial condition, bringing the abutment 26 into contact with the edge of the bridge 3 which is remote from the flange 24. The rail 11 is thus effectively locked in position on the support plate 1. The recesses 17 are then aligned with the apertures 8.

It is to be appreciated that the raft may be connected to the plate either in isolation or with a carriage mounted on the rail.

Figure 3:
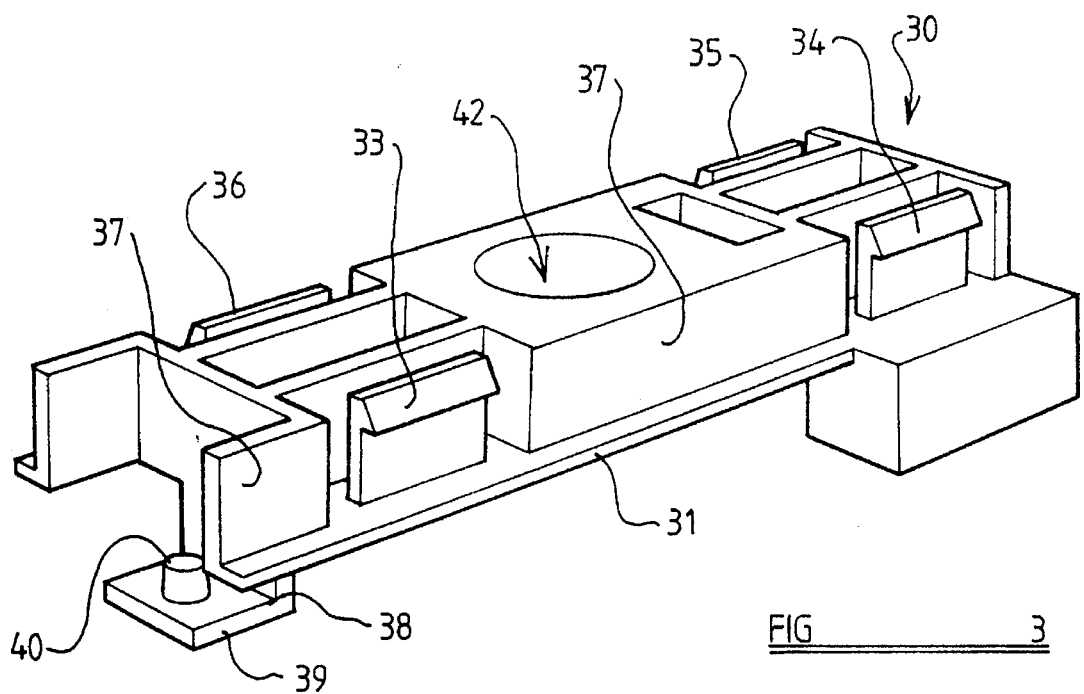
FIG. 3 is a perspective view from above and one side of a carriage intended to move along the rail of FIG. 2.
Figure 4:
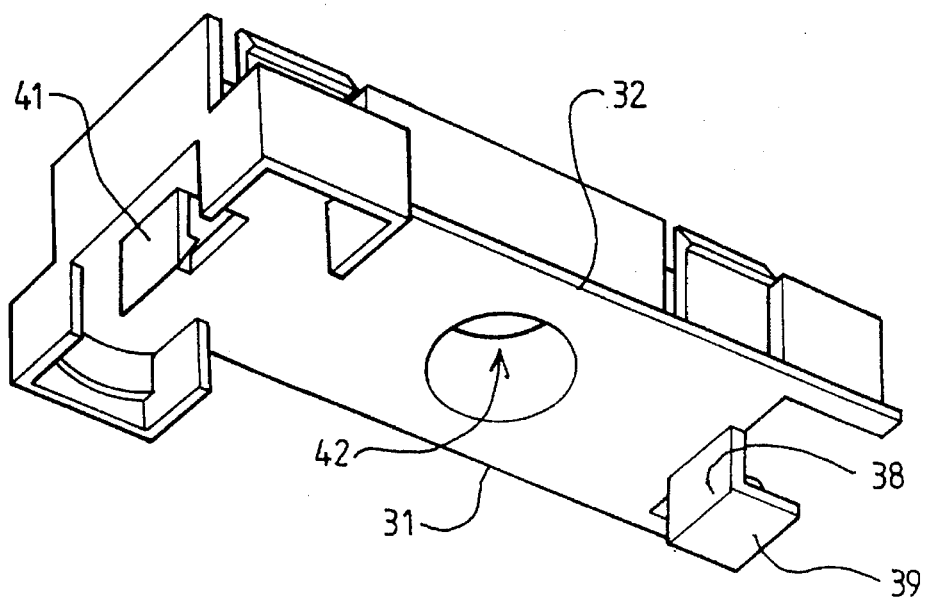
FIG. 4 is an underneath perspective view of the carriage of FIG. 3.

Referring now to FIGS. 3 and 4, a carriage 30 which is adapted to be mounted on the rail 11 is illustrated. The carriage 30 is of elongate form and presents two outwardly directed opposed lateral flanges 31, 32. Mounted on top of each flange are two upwardly extending resilient detent-carrying fingers 33, 34, 35, 36. The dimensioning of the resilient fingers is such that the carriage may be mounted on the rail by introducing the resilient fingers upwardly through the aperture 22, so that the flanges 31 and 32 are brought into contact with the bottom of the rail in the orientation illustrated in FIG. 2. The detents then engage the horizontal portions 27 defined on either side of the aperture 22.

The carriage 30 also presents various laterally directed surfaces 37 which extend upwardly above the flanges 31, 32 these surfaces 37 being adapted to engage the edges of the aperture 22. The carriage is thus mounted for sliding movement along the rail 11, with the surface 37 forming guide means.

At one end of the carriage, shown to the left in FIG. 3 and to the right in FIG. 4, there is a downwardly directed projection 38 which carries a horizontally directed platform 39, the platform extending substantially parallel with the flanges 31 and 32. The platform 39 carries an upwardly directed protrusion 40 adapted to engage a spring as will be described hereinafter.

The other end of the carriage is provided with a downwardly extending finger 41 extending beneath the bottom of the carriage and carrying a detent The purpose of this finger 41 will be explained hereinafter.

A central aperture 42 is defined which extends through the carriage at a substantially central position to accommodate a bolt as will be described hereinafter in greater detail.

Figure 5:
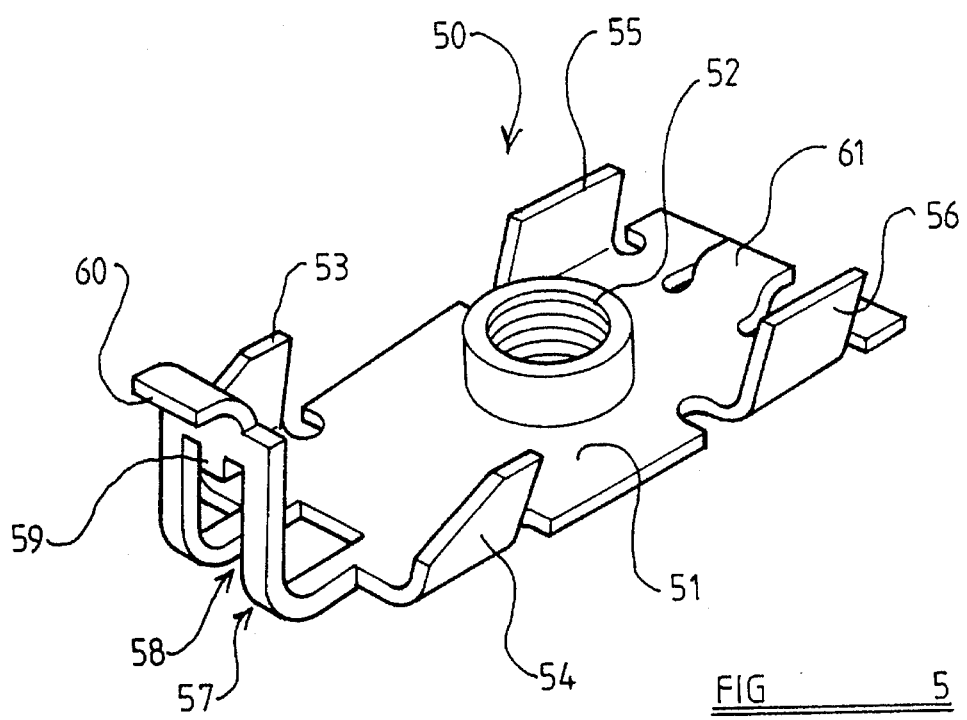
FIG. 5 is a perspective view of a locking element adapted to be carried on the carriage.

FIG. 5 illustrates a metal latching element 50 which consists of a substantially rectangular plate 51 carrying a central upstanding boss 52 which is internally threaded. On each side of the plate arc two pairs of upstanding teeth. The first pair of teeth 53, 54 each have one sloping side face and one substantially vertical side face. The second pair of opposed teeth 55, 56 have substantially vertical side faces.

At the end of the plate adjacent the teeth 53, 54 is an upstanding swan-neck 57 which has a central rectangular aperture 58 formed in it, so that the swan-neck arrangement appears to resemble two fingers which extend from the end of the plate and are then cranked upwardly, the fingers being interconnected at their upper part by a bridge. The bridge carries a downwardly directed tang 59 adapted to engage with the spring mentioned above and the bridge terminates with a forwardly directed tab 60.

At the other end of the latch element, the plate 51 defines an upwardly and forwardly directed finger 61.

Figure 8:
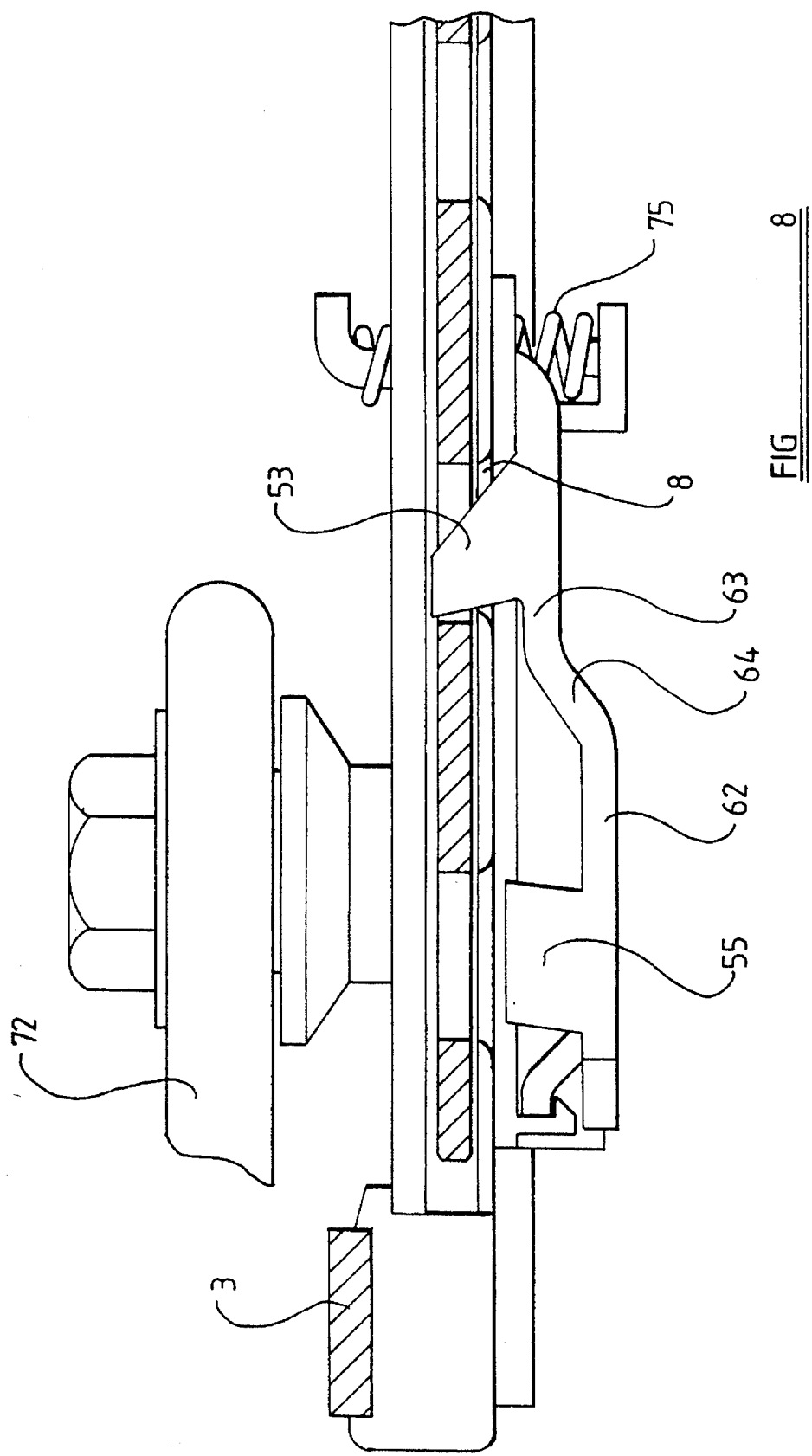
FIG. 8 is a side view corresponding to FIG. 7.
Figure 9:
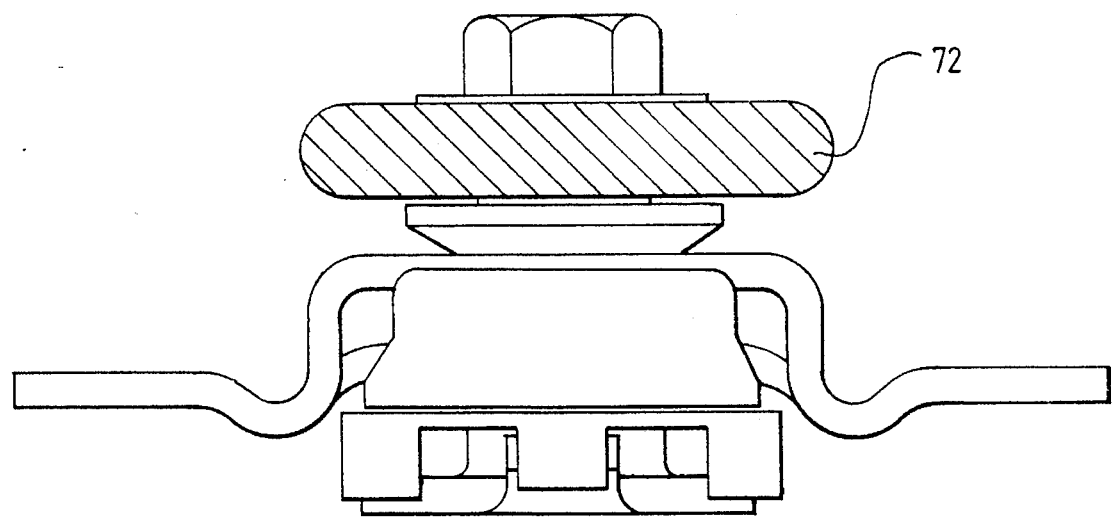
FIG. 9 is an end view taken along the line IX—IX of FIG. 7.
Figure 10:
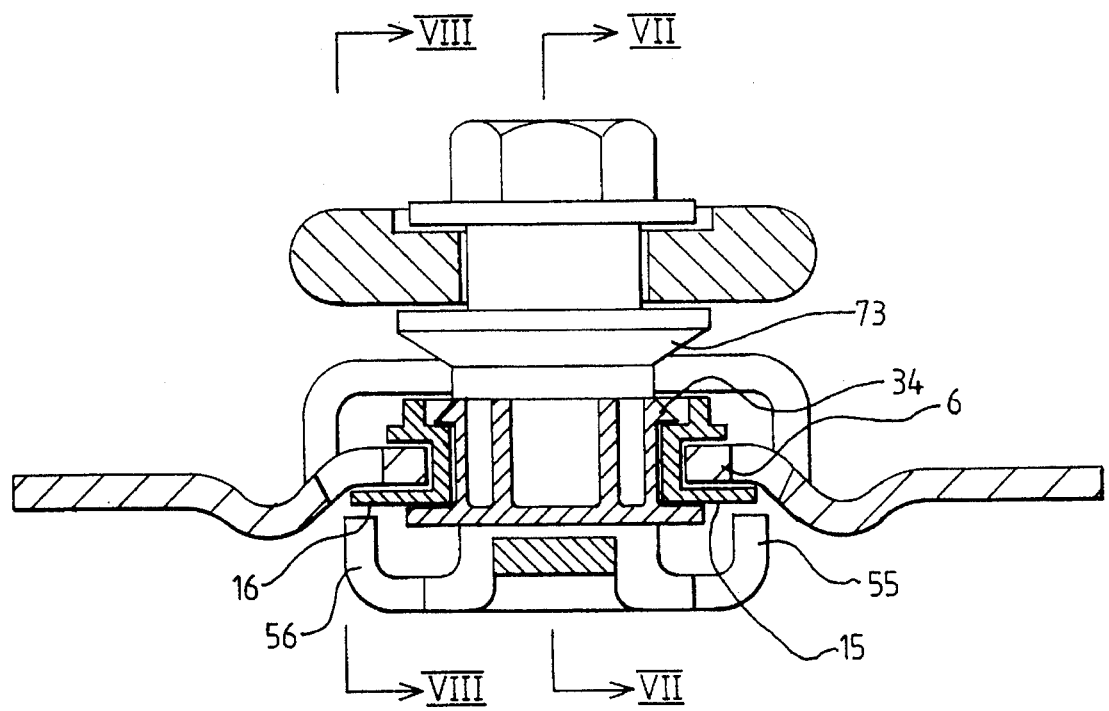
FIG. 10 is a sectional view taken along the line XX of FIG. 7, FIG. 10 carrying lines VI–VII showing the section of FIG. 7 and VIII—VIII showing the view of FIG. 8.

As can be seen more clearly from FIG. 8, the plate 51 is not planar but has a lower portion 62 and an upper portion 63 separated by a cranked portion 64. The upper portion 63 carries the teeth 53 and 54 and the lower portion 62 carries the teeth 55 and 56, as well as the boss 52.

Figure 6:
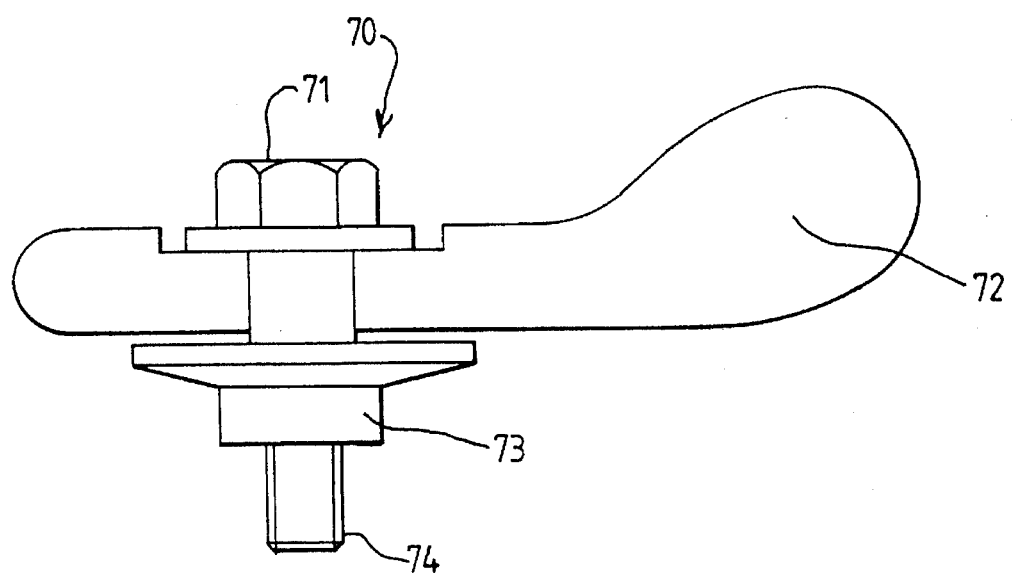
FIG. 6 is a perspective view of a loop and a securing bolt to be mounted on the carriage.

FIG. 6 illustrates a combination 70 of a bolt 71 and a loop 72 to guide pan of a safety belt. A spacer 73 is mounted on the shank of the bolt, adjacent the threaded end 74 of the bolt.

Referring now to FIGS. 7 to 10, it can be seen that the metal latching element 50 of FIG. 5 is connected to the carriage 30 of FIGS. 3 and 4 by introducing the downwardly directed projection 38 downwardly through the rectangular aperture 58 formed in the swan-neck 57 so that the upwardly directly protrusion 40 is located immediately beneath the downwardly directed tang 59.

A helical compression spring 75 is mounted in position engaging the upwardly directed protrusion 40 and the downwardly directed tang 59. The upwardly and forwardly directed finger 61 provided at the other end of the metal latching element 50 is engaged with the detent on the finger 41. The threaded boss 52 provided at the center of the metal latching element 50 is substantially aligned with the aperture 42 formed in the carriage 30 and the spacer 73 provided on the bolt is inserted downwardly through that aperture 42 so that the threaded end 74 of the bolt may be inserted into the threaded boss 52. The loop 72 is thus connected to the metal latching element 50.

Figure 7:
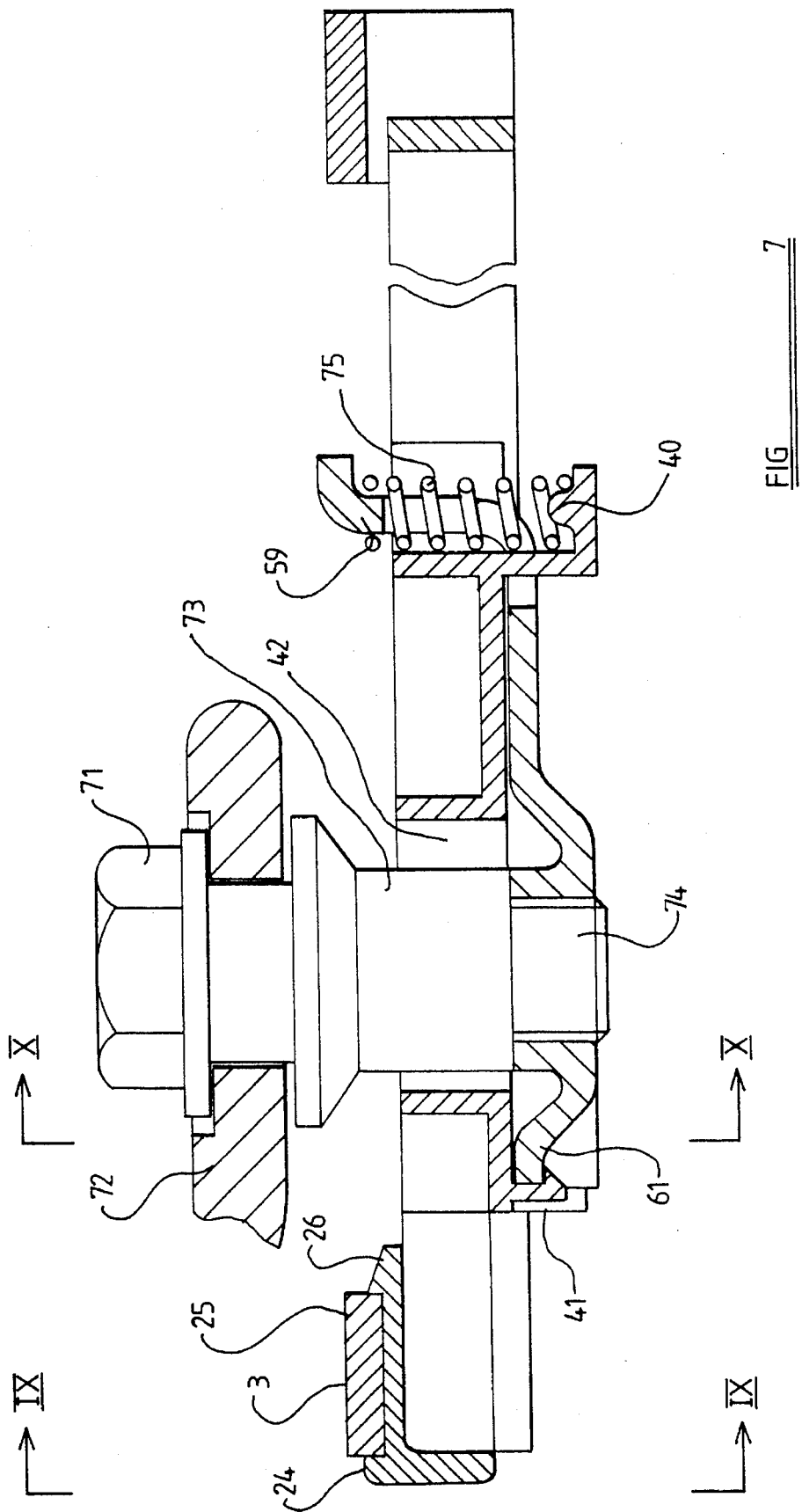
FIG. 7 is a longitudinal sectional view of the carriage, and locking element, when assembled, together with the loop and bolt, showing part of the rail and support element.

It is to be appreciated that the metal latching element 50 is effectively pivotally connected to the carriage 30 by the engagement between the upwardly and forwardly directed finger 61 and the finger 41, and the spring 75 biases the metal latching element 50 to the position illustrated in FIG. 7.

However, if an appropriate force is applied to the bolt 71, by appropriately manipulating the guide loop 72, the metal latching element 50 may be caused to pivot about the pivot point between the finger 61 and the finger 41, thus compressing the spring 75.

From FIG. 8 it is to be appreciated that when the metal latching element 50 is in the latching condition illustrated in FIG. 7, the tooth 53 engages with an aperture 8 formed in the inwardly directed lip 6 and with a recess 17 formed in the flange 13 on the raft, which recesses 17 are co-aligned with the apertures 8. Thus, the carriage 30 is prevented from movement not only by engagement of the tooth 53 with the aperture 8 but also by engagement of the tooth 53 with the recess 17.

The tooth 54 provided on the other side of the carriage 30 similarly engages the corresponding aperture 7 and a corresponding recess in the flange 14 provided on the rail 11.

It is to be noted that the tooth 56 carried by the carriage 30 is substantially aligned with the next adjacent aperture 8 which again is co-aligned with the next adjacent recess 17.

The situation is thus such that if a substantial force is applied to the loop 72, causing the metal latching element and/or the rail 11 to deform the rail, the tooth 55 will become inserted into the aperture 8 and recess 17 lying adjacent the tooth 55, thus providing an additional locking effect. Similarly the tooth 56 will also be inserted in a co-aligned aperture and recess, and thus all four teeth 53–56 will then contribute to the locking effect. It will be understood that the teeth 53 and 54 normally serve to lack the carriage in position to prevent movement of the carriage, and the teeth 56 and 55 provide an additional locking effect if required.

From FIG. 8 it can also be seen that if the metal latching element 50 is moved pivotally, compressing the spring 75, the teeth 53 and 54 will become disengaged from the apertures formed in the support plate 1 and the recesses formed in the rail 11 permitting the carriage 30 to move in a slidable manner. The carriage 30 can be locked, with the teeth 53, 54 engaging selected apertures and recesses, so that the loop 72 may be positioned at a convenient height for a person who is to wear the safety belt guided by the loop.

In a modified embodiment, a push button may be mounted on the bolt 71, and the button may be pushed when the metal latching element is to be disengaged from the rail.

It will be understood that during the manufacture of the body of the motor vehicle, a piffle such as the plate 1 will be welded or otherwise secured in position. The rail, carriage and metal latching element will be assembled together, and the operation of these components will be tested. The teeth formed on the may engage the recesses formed on the rail to effect locking of the carriage. The combination of the rail, the carriage and the metal latching element may then be slid onto the support plate, and the loop may be bolted into position, during the final stages of assembly of the car.

If the bridges 3, 4 are reversed, to extend behind the plate 1, the combination of the rail, the carriage and the metal latching element, together with the loop, may be slid into position on the plate 1. Only one bridge need be reversed, provided that the head of the rail is redesigned to engage the bridge from beneath, rather than from above.

Because the carriage and the rail are of plastic, the carriage moves smoothly with no noise. However, the metal teeth of the metal latching element, which is connected by the loop to the bolt, engage directly the apertures in the support plate, this provides the necessary strength where it is needed.

I claim:

1. A height adjuster for a safety belt arrangement, the height adjuster comprising:

a support plate including means for fixing the position thereof to a car frame and having opposed lips defining therebetween an axially extending slot, said support plate also having at least one aperture or recess therein, a rail connected to said support plate, a carriage mounted and movably retained on said rail for sliding movement along said rail, said rail slidably supporting said carriage, said carriage solely ending portions of said rail located on opposed sides of said engaging support plate, the portions separating said carriage from the opposed lips, and a latch, carried by said carriage, for engaging said at least one aperture or recess in said support plate to selectively lock said carriage in position, wherein at least one element of the group comprising the rail and the carriage being made of a plastics material; and wherein said latch engages said support plate so that any significant load applied is transferred by said latch to said support plate.

2. A height adjuster according to claim 1 wherein, said rail includes means for sliding said rail into position on said lips.

3. A height adjuster according to claim 1, wherein said rail is provided with at least one aperture or recess, and wherein said latch includes at least one tooth for engaging with said at least one aperture or recess provided in said support plate and with said at least one aperture or recess provided in said rail to lock said carriage in position.

4. A height adjuster according to claim 1, wherein said at least one aperture or recess of said support plate comprises a plurality of apertures or recesses, and wherein said latch is provided with first and second sets of teeth, said first set of teeth for engaging first ones of said plurality of apertures or recesses to selectively lock the carriage in position, said second set of teeth for engaging further ones of said apertures or recesses only when said latch is subjected to a significant load.

5. A height adjuster according to claim 4, wherein said latch comprises a cranked plate, said first set of teeth being on a first end of said cranked plate and said second set of teeth being on a second end of said cranked plate.

6. A height adjuster according to claim 1, wherein said latch is pivotally connected to said carriage.

7. A height adjuster according to claim 1, wherein said support plate comprises a plate formed of metal, having two side portions laying in a common plane interconnected by bridges each extending to one side of said common plane of said side portions, said plate thus defining a substantially open axial channel extending over the entire length of said plate.

8. A height adjuster according to claim 1, wherein said support plate comprises a metal plate which is secured to a post of a motor vehicle.

9. A height adjuster according to claim 1, further comprising a guide loop for guiding a safety belt, said guide loop being carried by said carriage.

10. A height adjuster for a safety-belt arrangement, the height adjuster comprising:

a support plate including means for fixing the position thereof to a car frame, and having opposed lips defining therebetween an axially extending slot, a rail for connection to the support plate, a carriage slidably mounted and retained on said rail for sliding movement along said rail, said carriage solely engaging portions of said rail located on opposed sides of the support plate the portions separating said carriage from the opposed lips, and a guide loop, for guiding a safety-belt, carried by said carriage, wherein said carriage is provided with locking means for selectively locking said carriage in position at predetermined positions along said rail, wherein said rail is provided with first means for cooperating with said locking means for preventing movement of said carriage along the rail, and wherein said support plate is provided with second means for cooperating with said locking means for preventing movement of said carriage when said rail is connected to said first element, at least one element of the group comprising the rail and the carriage being made of plastics material.

11. A method of assembling a height adjuster comprising the steps of:

forming a unit by mounting a carriage for sliding movement on a rail, the carriage being provided with locking means adapted to lock the carriage in position at predetermined positions along the rail, the rail being provided with means to co-operate with the locking means, the rail slidably supporting the carriage, testing the operation of the unit including the carriage and locking means, and subsequently mounting the rail of the unit on a support element fixed to a frame of a motor vehicle, the said support element being provided with means to engage and co-operate with the said locking means, wherein the locking means of the carriage engages the co-operating means provided on the support element when the rail, together with the carriage, has been mounted on the support element.

12. A height adjuster for a safety belt arrangement, the height adjuster comprising:

a first element including means for fixing the position thereof and having a plurality of apertures or recesses therein;

a rail, having a plurality of apertures or recesses, for connection to said first element;

a carriage mounted and movably retained on said rail for sliding movement along said rail; and a latch, carried by said carriage, for engaging said plurality of apertures or recesses in said first element to selectively lock said carriage in position;

wherein said latch includes first and second sets of teeth for locking said carriage in position;

wherein said first set of teeth are for engaging first ones of said plurality of apertures or recesses provided in said first element and with first ones of said plurality of apertures or recesses provided in said rail;

wherein said first set of teeth selectively lock the carriage in position;

wherein said second set of teeth are for engaging second ones of said plurality of apertures or recesses provided in said first element and with second ones of said plurality of apertures or recesses provided in said rail, said second set of teeth only engaging when said latch is subjected to a load exceeding a predefined threshold; and wherein said latch comprises a cranked plate, said first set of teeth being on a first end of said cranked plate and said second set of teeth being on a second end of said cranked plate.

13. A height adjuster according to claim 12, further comprising a guide loop for guiding a safety belt, said guide loop being carried by said carriage.

14. A method of assembling a height adjuster comprising the steps of:

forming a unit by mounting a carriage for sliding movement on a rail, the carriage being provided with locking means adapted to lock the carriage in position at predetermined positions along the rail, the rail being provided with means to co-operate with the locking means, the rail slidably supporting the carriage, testing the operation of the unit including the carriage and locking means, and subsequently mounting the rail of the unit on a support element which is one of:

formed integrally with a frame of a motor vehicle, and fixed to a frame of a motor vehicle, said support element being provided with means to engage and co-operate with the said locking means;

wherein the locking means of the carriage engages the co-operating means provided on the support element when the rail, together with the carriage, has been mounted on the support element.

15. A method of assembling a height adjuster comprising the steps of:

providing a carriage with locking means;

providing a support element fixed to a frame of a motor vehicle, the support element having means to cooperate with the carriage locking means;

forming a unit by mounting the carriage for sliding movement on a rail;

subsequent to said forming step, mounting the rail on the support element so that the rail separates the carriage from the support element and;

positioning the carriage locking means to engage the cooperating support element means, when the rail, together with the carriage, have been mounted on the support element.

* * * * *